UNITED STATES PATENT OFFICE.

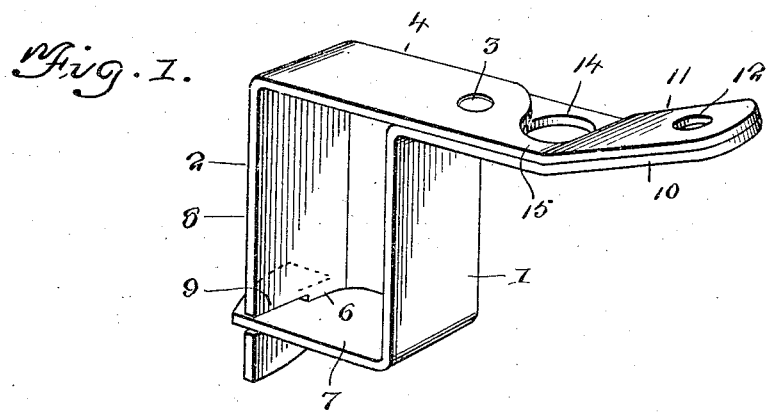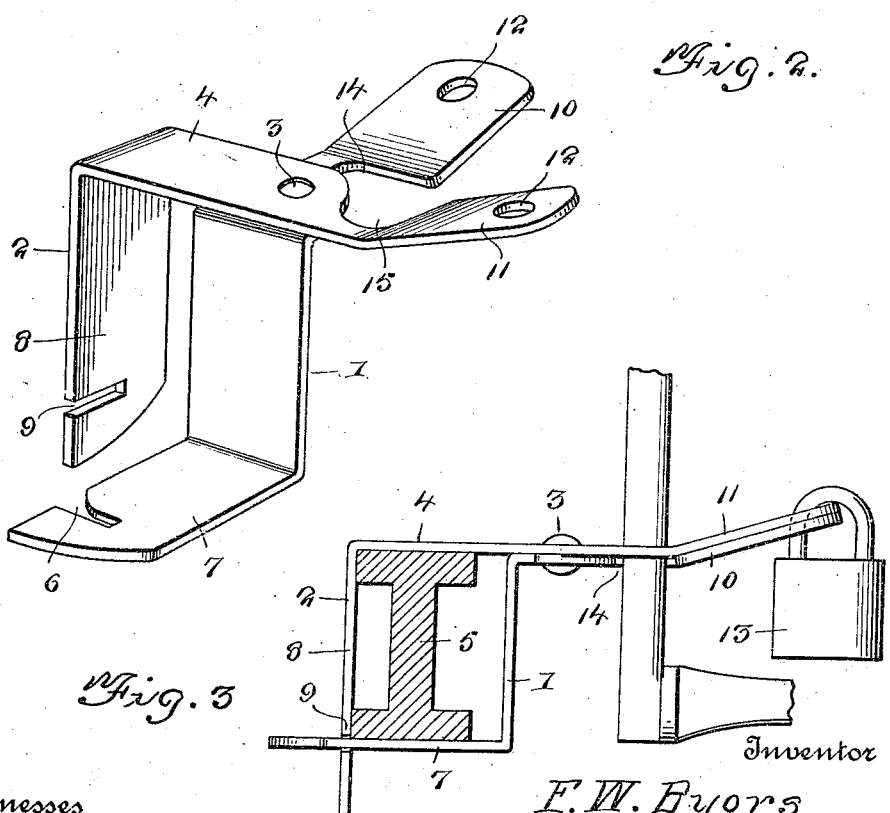

FRED W. BYORS, OF KANSAS CITY, MISSOURI.

STARTING-CRANK LOCK FOR MOTOR-VEHICLES.

1,295,689.  Specification of Letters Patent.  Patented Feb. 25, 1919.

Application filed December 14, 1917. Serial No. 207,149.

*To all whom it may concern:*

Be it known that I, FRED W. BYORS, a citizen of the United States, residing at Kansas City, in the county of Jackson and State of Missouri, have invented new and useful Improvements in Starting-Crank Locks for Motor-Vehicles, of which the following is a specification.

This invention relates to starting crank locks for motor vehicles, the object in view being to produce a device of the character referred to which may be readily applied to the front axle and starting crank of an automobile or motor truck for the purpose of holding the crank in a fixed position and preventing any one from operating said crank for the purpose of starting the engine of the motor vehicle.

A further object of the invention is to provide a device of the class referred to, which may be detached from the starting crank and axle and placed in one of the compartments or the tool box of the vehicle. The device may be used on any number of machines of the same kind, being transferable from one machine to another.

A further object of the invention is to provide a device of the character referred to embodying two relatively movable members adapted to embrace and engage the front axle of the vehicle and the starting crank, said members being adapted to be held in fixed relation to each other by means of a single padlock.

With the above and other objects in view, the invention consists in the novel construction, combination and arrangement of parts, herein fully described, illustrated and claimed.

In the accompanying drawing:—

Figure 1 is a perspective view of the locking device detached, showing the parts in their locking relation to each other.

Fig. 2 is a similar view of the device showing the members thrown open to receive the front axle and starting crank of the vehicle.

Fig. 3 is a vertical transverse section through the front axle of the vehicle, showing the applied relation of the crank locking device to said axle and to the starting crank.

The starting crank lock contemplated in this invention comprises two relatively movable members 1 and 2 which are connected together by a pivot 3. The member 2 has its upper end portion extended horizontally in a forward direction to provide an overhanging portion 4 adapted to rest on top of the front axle 5 of a motor vehicle. The member 1 is formed with a notch or slot 6 extending inwardly from one of the side edges thereof. The other member 1 also has a rearwardly extending portion 7 which underlies the axle 5. Said member 2 also has a downwardly extending end portion 8 which is provided with a slot 9 extending inwardly from one edge thereof. The portions 7 and 8 of the members 1 and 2 respectively are of sufficient length to cross or intersect each other and the slots therein are of such size and shape as to permit the parts 7 and 8 to interfit and interlock as shown in the drawings. The device as a whole is thus adapted to completely embrace and surround the axle 5 when the parts are in the position illustrated in Fig. 1 and as shown in Fig. 3.

The members 1 and 2 are also provided with forwardly-extending portions or arms 10 and 11 formed in the lower extremities thereof with corresponding holes 12 to receive a padlock 13 which, when in place, prevents any relative movement between the members 1 and 2. The member 1 is formed in one side thereof with a starting crank receiving slot 14 and the member 2 is formed in the side thereof with an open crank receiving slot 15. The arrangement of the slots 14 and 15 is such that when the members 1 and 2 are brought into the relation shown in Figs. 1 and 3, the handle portion of the starting crank is held in the slots 14 and 15 thus preventing any unauthorized person from starting the engine.

From the foregoing description taken in connection with the accompanying drawings it will now be understood that in order to apply the locking device to a motor vehicle, the members 1 and 2 are first opened to the position illustrated in Fig. 2. The device is then slipped over the axle 5 from the rear until it occupies the position shown in Fig. 3. The member 1 is then rocked to a closed position so as to engage and hold the starting crank, after which a padlock is inserted through the holes 12. The starting crank is thus securely held against movement. When the operator desires to again start the engine, he removes the padlock 13, then rocks the member 1 to an open position and then slips the device as a whole off the axle. It will be understood that the device may be carried in the tool box or any compartment of the car.

I claim:—

1. A starting crank locking device for motor vehicles consisting of two holding members having a positive pivotal connection with each other, each holding member having an L-shaped portion and said L-shaped portions being opposed to each other when in their applied position adapting them to embrace a vehicle axle of T-beam formation, said holding members also having elevated projecting arms which normally extend to a point in front of the vehicle axle and are formed with complemental crank holding slots, and means for locking said holding members against relative movement.

2. A starting crank locking device for motor vehicles consisting of two holding members having a positive pivotal connection with each other, each holding member having an L-shaped portion and said L-shaped portions being opposed to each other when in their applied position adapting them to embrace a vehicle axle of T-beam formation, said L-shaped portions being formed with reversely disposed open slots adapting the same to interfit, said holding members also having elevated projecting arms which normally extend to a point in front of the vehicle axle and are formed with complemental crank holding slots and means for locking said holding members against relative movement.

In testimony whereof I affix my signature.

FRED W. BYORS.

Copies of this patent may be obtained for five cents each, by addressing the "Commissioner of Patents, Washington, D. C."